US008030401B1

(12) United States Patent
Klemarczyk et al.

(10) Patent No.: US 8,030,401 B1
(45) Date of Patent: Oct. 4, 2011

(54) PHOTOINITIATED CATIONIC EPOXY COMPOSITIONS

(75) Inventors: Philip T. Klemarczyk, Canton, CT (US); Anthony F. Jacobine, Meriden, CT (US)

(73) Assignee: Henkel Corporation, Rocky Hill, CT (US)

( * ) Notice: Subject to any disclaimer, the term of this patent is extended or adjusted under 35 U.S.C. 154(b) by 1105 days.

(21) Appl. No.: 11/498,422

(22) Filed: Aug. 3, 2006

(51) Int. Cl.
C08G 59/68 (2006.01)
C08F 8/18 (2006.01)
C08L 27/06 (2006.01)
C08L 63/02 (2006.01)

(52) U.S. Cl. .......... 525/121; 525/119; 525/471; 522/11; 522/12; 522/67; 522/147; 522/170; 252/182.12; 252/182.13; 252/182.15; 252/182.28; 252/182.29

(58) Field of Classification Search .................. None
See application file for complete search history.

(56) References Cited

U.S. PATENT DOCUMENTS

| 4,058,400 | A | 11/1977 | Crivello |
| 4,058,401 | A | 11/1977 | Crivello |
| 4,219,654 | A | 8/1980 | Crivello |
| 4,227,978 | A | 10/1980 | Barton |
| 4,505,793 | A | 3/1985 | Tamoto et al. |
| 4,916,805 | A | 4/1990 | Ellrich et al. |
| 5,079,378 | A | 1/1992 | Crivello |
| 5,254,525 | A * | 10/1993 | Nakajima et al. ............ 503/227 |
| 5,395,862 | A | 3/1995 | Neckers et al. |
| 5,451,343 | A | 9/1995 | Neckers et al. |
| 5,545,676 | A | 8/1996 | Palazzotto et al. |
| 5,550,265 | A | 8/1996 | Castellanos et al. |
| 5,668,192 | A | 9/1997 | Castellanos et al. |
| 6,014,929 | A * | 1/2000 | Teng ............................ 101/456 |
| 6,147,184 | A | 11/2000 | Castellanos et al. |
| 6,153,661 | A | 11/2000 | Castellanos et al. |
| 6,291,540 | B1 | 9/2001 | Priou et al. |
| 6,342,545 | B1 * | 1/2002 | Klemarczyk et al. ......... 523/176 |
| 6,572,980 | B1 * | 6/2003 | Klemarczyk et al. ......... 428/620 |
| 2007/0267134 | A1 * | 11/2007 | Konarski et al. ............ 156/273.3 |

FOREIGN PATENT DOCUMENTS

| EP | 0 369 645 A1 | 5/1990 |
| EP | 0 563 925 B1 | 2/2000 |
| FR | 1377670 | 11/1964 |
| JP | 52077156 A2 | 6/1977 |
| JP | 56010539 A2 | 2/1981 |
| JP | 62079250 A2 | 4/1987 |
| JP | 07252146 A2 | 10/1995 |
| JP | 10060232 A2 | 3/1998 |
| JP | 1998060232 A | 3/1998 |

(Continued)

OTHER PUBLICATIONS

EPONEX(TM) Resin 1510 Material Safety Data Sheet; Jun. 25, 2005; Hexion Specialty Chemicals.

(Continued)

*Primary Examiner* — John J Figueroa
(74) *Attorney, Agent, or Firm* — Steven C. Bauman

(57) ABSTRACT

The present invention is directed to photoinitiated cationic epoxy compositions including: (a) at least one substantially saturated epoxy material comprising at least two glycidyl ether groups; (b) about 0.1 to about 20 weight percent on a basis of total weight of the composition of at least one polymer comprising at least one vinyl chloride segment and at least one vinyl acetate segment; and (c) at least one cationic photoinitiator; and bonded substrates and methods of bonding including the same.

23 Claims, 2 Drawing Sheets

FOREIGN PATENT DOCUMENTS

| WO | WO 97/36516 A1 | 10/1997 |
|---|---|---|
| WO | WO 98/46647 A1 | 10/1998 |
| WO | WO 2004/011848 A2 | 2/2004 |
| WO | WO 2006/001928 A1 | 1/2006 |

OTHER PUBLICATIONS

EPALLOY(R) 5000 Material Safety Data Sheet; Feb. 4, 2004; CVC Specialty Chemicals; Inc.

Photoinitiators for UV Curing Key Products Selection Guide; Oct. 2003; Ciba Specialty Chemicals.

Ciba(R) ALCOTAC(R) 1235; Feb. 2004; Ciba Specialty Chemicals.

Araldite(R) ECN 1273*/Araldite ECN 1280*/Araldite ECN 1299*/Araldite ECN 9511* Novolac Epoxy Resin Data Sheet; Mar. 2004; Huntsman.

UCAR VYLF-X Solution Vinyl Resin Product Information; May 2003; The Dow Chemical Company.

UCAR Solution Vinyl Resins: Flexible Solutions for Coatings; Sep. 2002; The Dow Chemical Company.

UCAR Solution Vinyl Resins: Proven Performance-New Solutions; Jan. 2003; The Dow Chemical Company.

UCAR Solution Vinyl Resins for Coatings; Oct. 1998; Union Carbide.

TONE 0201 Polyol Product Information; Dec. 2001; The Dow Chemical Company.

TONE 0210 Polyol Product Information; Dec. 2001; The Dow Chemical Company.

TONE 0310 Polyol Product Information; Dec. 2001; The Dow Chemical Company.

K-FLEX(R) Polyester Polyols; Nov. 22, 2006; King Industries.

SarCar K185 Technical DataSheet Abstract; Nov. 20, 2006; SpecialChem S.A.

Rhodorsil Photo Initiator 2074 Material Safety Data Sheet; Nov. 20, 2006; Rhodia Inc.

Koleske, Joseph V.; Copolymerization and Properties of Cationic, Ultraviolet Light-Cured Cycloaliphatic Epoxide Systems; Polymers Paint Colour Journal; 1989; pp. 796-8, 800, 802, 804; vol. 179 (4249); Solvents Coat. Mater. Div., Union Carbide Corp.; USA, Abstract Only.

Manus, P.; UV Cure Cationic Technology; Polymers Paint Colour Journal; 1989; vol. 179 (4242); Union Carbide Europe S.A.; Switzerland.

* cited by examiner

PHOTOINITIATED CATIONIC EPOXY COMPOSITIONS

BACKGROUND OF THE INVENTION

1. Field of the Invention

The present invention is directed to photoinitiated cationic epoxy compositions having good impact strength and toughness.

2. Brief Description of Related Technology

Photoinitiated, cationically curable adhesive compositions based on epoxy resins have many benefits and advantages desirable to end user consumers. For example, such compositions provide cured products having physical properties comparable to those provided by thermosetting compositions, are less inhibited by oxygen than photoinitiated free radical curable compositions (resulting in faster and more thorough cure), and exhibit less shrinkage during cure than otherwise comparable photoinitiated free radical curable compositions (such as those based on acrylic chemistry).

Photoinitiated cationic adhesive compositions have, therefore, been used in various well-known applications such as liquid crystal displays and as laminates in digital video discs.

There has been an ongoing desire to find photoinitiated adhesive compositions having good impact strength and toughness, because photocure mechanisms are ordinarily more rapid than heat cure mechanisms and can avoid heat degradation of the overall device, part and/or substrate.

SUMMARY OF THE INVENTION

In some embodiments, the present invention provides a photoinitiated cationically curable composition, comprising:
(a) at least one substantially saturated epoxy material comprising at least two glycidyl ether groups;
(b) about 0.1 to about 20 weight percent on a basis of total weight of the composition of at least one polymer comprising at least one vinyl chloride segment and at least one vinyl acetate segment; and
(c) at least one cationic photoinitiator.

Also, the present invention provides methods of preparing such compositions, methods of using such compositions, assembling devices with such compositions, and reaction products of such compositions as well as the so-assembled devices.

DETAILED DESCRIPTION OF THE INVENTION

Figure 1:
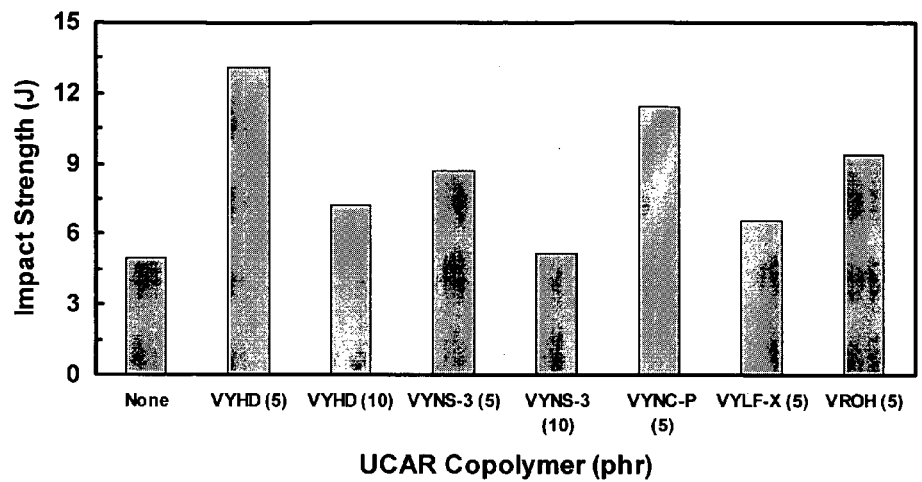
FIG. 1 is a bar chart of impact strength for several compositions comprising hydrogenated bisphenol A epoxy resin and selected vinyl chloride/vinyl acetate copolymers, according to the present invention.

Other than in the operating examples, or where otherwise indicated, all numbers expressing quantities of ingredients, thermal conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

Also, it should be understood that any numerical range recited herein is intended to include all sub-ranges subsumed therein. For example, a range of "1 to 10" is intended to include all sub-ranges between and including the recited minimum value of 1 and the recited maximum value of 10, that is, having a minimum value equal to or greater than 1 and a maximum value of equal to or less than 10.

As noted above, in some embodiments the present invention provides a photoinitiated cationically curable composition, comprising: (a) at least one substantially saturated epoxy material comprising at least two glycidyl ether groups; (b) about 0.1 to about 20 weight percent on a basis of total weight of the composition of at least one polymer comprising at least one vinyl chloride segment and at least one vinyl acetate segment; and (c) at least one cationic photoinitiator.

The compositions of the present invention comprise one or more substantially saturated epoxy materials, such as for example compounds, polymers or resins. As used herein, "substantially saturated" means that the epoxy material has single covalent bonds between carbon atoms in the chain, for example an alkylene moiety, or the epoxy resin can have several double bonds (conjugated or non-conjugated, and/or as part of a non-aromatic ring) between the carbon atoms, for example an alkenylene moiety or cyclohexene moiety. In some embodiments, the epoxy material is fully saturated or hydrogenated. In some embodiments, the epoxy material is free of carbonyl groups along the backbone.

Embraced within the substantially saturated epoxy material are those compounds within the following structure

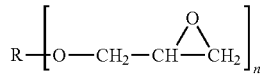

wherein n is 2-7 and R is any substantially saturated hydrocarbon, optionally containing ether or ester linkages. R therefore may be alkyl, alkenyl or cycloalkyl.

Non-limiting examples of such substantially saturated epoxy materials include $C_2$-$C_{70}$ alkyl glycidyl ethers; $C_2$-$C_{70}$ alkyl glycidyl esters (such as epoxidized castor oils); cycloalkyl or cycloalkenyl glycidyl ethers; or polyglycidyl ethers of hydrogenated pyrocatechol, hydrogenated resorcinol, hydrogenated hydroquinone (or 1,4-dihydroxy cyclohexane), 4,4'-dihydroxydicyclohexyl methane (or hydrogenated bisphenol F), 4,4'-dihydroxy-3,3'- dihydroxydicyclohexyl methane, 4,4'-dihydroxydicyclohexyl dimethyl methane (or hydrogenated bisphenol A), such as EPALLOY 5000 available from CVC Specialty Chemicals Inc. of Moorestown, N.J. or hydrogenated EPON bisphenol A epoxy resins, for example EPONEX 1510 diglycidyl ether of hydrogenated bisphenol A epoxy resin available from Hexion having the structure:

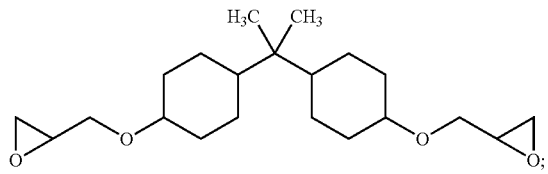

and diglycidyl ethers of hydrogenated bisphenol A epoxy resins such as EPON 825, EPON 826, EPON 829, EPON 1001F; EPON 1002F; EPON 1004F; EPON 1007F; EPON 1009F (CAS No. 25036-25-3) EPON 3001; EPON 3002; EPON 2002; EPON 2003; EPON 2004; EPON 2005; EPON 2012; EPON 2014; EPON 2024; and EPON 2042 epoxy resins available from Resolution Performance), 4,4'-dihydroxydicyclohexyl methyl methane, 4,4'-dihydroxydicyclohexyl cyclohexane, 4,4'-dihydroxy-3,3'-dimethyldicyclohexyl propane, 4,4'-dihydroxydicyclohexyl sulfone (or hydrogenated bisphenol S), tris(4-hydroxycyclohexyl)methane, butanediol diglycidyl ether and combinations thereof.

Other epoxy resins suitable for use in the present invention include diglycidyl ethers of hydrogenated epoxy materials such as SU-8 (bisphenol A-type epoxy novolac); from Dow Chemical Co. under the DER trade designation, such as DER 331, DER 332, DER 383, DER 354, and DER 542; from Vantico Inc., Brewster, N.Y. under the ARALDITE tradename, such as ARALDITE [phenol-4,4'-(1-methylethylidene)bis with (chloromethyl)oxirane (CAS No. 25068-38-6)], ARALDITE ECN 1299 [formaldehyde, polymer with (chloromethyl)oxirane and 2-methylphenol, melting point 85-100° C. (CAS No. 29690-82-2)], ARALDITE ECN 1285 [formaldehyde, polymer with (chloromethyl)oxirane and 2-methylphenol, melting point 80-90° C. (CAS No. 29690-82-2)], and ARALDITE GT 7097 US [(phenol, 4-(1,1-dimethylethyl), polymer with (chloromethyl)oxirane and 4,4'-(1-methylethylidene)bis, melting point 113-123° C. (CAS No. 67924-34-9)]; and from Nippon Kayaku, Japan, BREN-S (a brominated epoxy resin, which is particularly useful for fire retardancy). Cresol analogs are also available under the tradenames ECN 1235, ECN 1273, and ECN 1299 from Ciba Specialty Chemicals. Combinations or mixtures of the different epoxy resins discussed above also can be used.

The epoxy material can be present in an amount up to about 99 percent by weight, such as about 40 to about 98 percent by weight, for example about 85 to about 95 percent by weight on a basis of total weight of the composition.

In some embodiments, the composition can further comprise up to about 25 weight percent, or about 0.1 to about 25 weight percent, of an aromatic (non-hydrogenated) epoxy resin, such as the bisphenol A epoxy materials mentioned above.

The composition comprises about 0.1 to about 20 weight percent on a basis of total weight of the composition of at least one (one or more) polymer(s) comprising at least one vinyl chloride segment and at least one vinyl acetate segment, such as vinyl chloride/vinyl acetate polymers. In some embodiments, the vinyl chloride/vinyl acetate polymer comprises about 80 to about 90 weight percent of vinyl chloride. In other embodiments, the vinyl chloride/vinyl acetate polymer comprises about 4 to about 20 weight percent of vinyl acetate. The vinyl chloride/vinyl acetate polymer can be a copolymer prepared from vinyl chloride and vinyl acetate, or a terpolymer or multipolymer prepared from vinyl chloride, vinyl acetate and any of the other monomers discussed below, such as hydroxyethyl acrylate.

Non-limiting examples of suitable vinyl chloride/vinyl acetate polymers include UCAR™ vinyl chloride/vinyl acetate solution resins which are available from Dow Chemical Company of Midland, Mich., such as UCAR™ VYNS-3 vinyl chloride/vinyl acetate polymer (prepared from 90 weight percent vinyl chloride and 10 weight percent vinyl acetate), UCAR™ VYHH vinyl chloride/vinyl acetate polymer (prepared from 86 weight percent vinyl chloride and 14 weight percent vinyl acetate), UCAR™ VYHD vinyl chloride/vinyl acetate polymer (prepared from 86 weight percent vinyl chloride and 14 weight percent vinyl acetate); UCAR™ VYNC-P vinyl chloride/vinyl acetate polymer (prepared from 65 weight percent vinyl chloride and 35 weight percent vinyl acetate); UCAR™ VYLF-X vinyl chloride/vinyl acetate polymer (prepared from 86 weight percent vinyl chloride and 14 weight percent vinyl acetate). UCAR™ VYNS-3 vinyl chloride/vinyl acetate polymer is provided as 15% resin solids in MEK/toluene solution, 67/33 by weight. UCAR™ VYHH vinyl chloride/vinyl acetate polymer is provided as 20% resin solids in MEK/toluene solution, 50/50 by weight. UCAR™ VYHD vinyl chloride/vinyl acetate polymer is provided as 25% resin solids in MEK/toluene solution, 33/67 by weight. Any solvent present is preferably removed prior to use. UCAR™ VYNC-P and VYLF-X polymers are supplied as powders.

In some embodiments, the vinyl chloride/vinyl acetate polymer comprises at least one hydroxy functional group. Non-limiting examples of suitable hydroxy functional vinyl chloride/vinyl acetate polymers include UCAR™ VAGH or VAGD hydroxy functional vinyl chloride/vinyl acetate polymers (prepared from 90 weight percent vinyl chloride, 4 weight percent vinyl acetate and 6 weight percent vinyl alcohol), and UCAR™ VAGF, VAGC or VROH hydroxy functional vinyl chloride/vinyl acetate polymer (prepared from 81 weight percent vinyl chloride, 4 weight percent vinyl acetate and 15 weight percent hydroxyalkyl acrylate).

The VAGH and VAGD polymers each have 2.3 weight percent of hydroxy functionality and a hydroxyl value of 76. The VAGF, VAGC and VROH polymers each have 1.8, 1.9 and 2.0 weight percent of hydroxy functionality, respectively, and a hydroxyl value of 59, 63 and 66, respectively.

UCAR™ VAGH hydroxy functional vinyl chloride/vinyl acetate polymer is provided as 20% resin solids in MEK/toluene solution, 50/50 by weight. UCAR™ VAGD hydroxy functional vinyl chloride/vinyl acetate polymer is provided as 25% resin solids in MEK/toluene solution, 50/50 by weight. UCAR™ VAGF hydroxy functional vinyl chloride/vinyl acetate polymer is provided as 20% resin solids in MEK/toluene solution, 50/50 by weight. UCAR™ VAGC hydroxy functional vinyl chloride/vinyl acetate polymer is provided as 30% resin solids in MEK/toluene solution, 50/50 by weight.

In some embodiments, the vinyl chloride/vinyl acetate polymer comprises at least one carboxy functional group. Non-limiting examples of suitable carboxy functional vinyl chloride/vinyl acetate polymers include UCAR™ VMCH carboxy functional vinyl chloride/vinyl acetate polymers (prepared from 86 weight percent vinyl chloride, 13 weight percent vinyl acetate and 1 weight percent maleic acid), UCAR™ VMCC carboxy functional vinyl chloride/vinyl acetate polymers (prepared from 83 weight percent vinyl chloride, 16 weight percent vinyl acetate and 1 weight percent maleic acid), and UCAR™ VMCA carboxy functional vinyl chloride/vinyl acetate polymers (prepared from 81 weight percent vinyl chloride, 17 weight percent vinyl acetate and 2 weight percent maleic acid). The VMCH, VMCC and VMCA carboxy functional polymers each have 1.0, 1.0 and 2.0 weight percent of carboxy functionality, respectively, and an acid number of 10, 10 and 19, respectively. UCAR™ VMCH carboxy functional vinyl chloride/vinyl acetate polymer is provided as 20% resin solids in MEK/toluene solution, 50/50 by weight. UCAR™ VMCC carboxy functional vinyl chloride/vinyl acetate polymer is provided as 25% resin solids in MEK/toluene solution, 25/75 by weight. UCAR™ VMCA carboxy functional vinyl chloride/vinyl acetate polymer is provided as 30% resin solids in MEK/toluene solution, 25/75 by weight.

In some embodiments, the vinyl chloride/vinyl acetate polymer comprises at least one hydroxy functional group and at least one carboxy functional group. Non-limiting examples of suitable hydroxy and carboxy functional vinyl chloride/vinyl acetate polymers include UCARMAG™ binder 527 hydroxy and carboxy functional vinyl chloride/vinyl acetate polymer (prepared from 82 weight percent vinyl chloride, 4 weight percent vinyl acetate and 14 weight percent maleic acid and hydroxyalkyl acrylate). The UCARMAG™ binder 527 has 2.0 weight percent of hydroxy and carboxy functionality, and a hydroxyl value of 59. UCARMAG™ binder 527 hydroxy and carboxy functional vinyl chloride/vinyl acetate polymer is provided as 20% resin solids in MEK/toluene solution, 50/50 by weight. In some embodiments, the vinyl chloride/vinyl acetate polymer further comprises about 1 to about 20 weight percent of hydroxyethyl acrylate.

In some embodiments, the vinyl chloride/vinyl acetate polymer comprises at least one epoxy functional group. A non-limiting example of a suitable epoxy functional vinyl chloride/vinyl acetate polymer is UCAR™ VERR-40 epoxy functional vinyl chloride/vinyl acetate polymers (prepared from 82 weight percent vinyl chloride, 9 weight percent vinyl acetate and 9 weight percent epoxy containing monomer) as 40% resin solids in MEK/toluene solution, 3/2 by weight. The VERR-40 polymer has 1.8 weight percent epoxy functionality (oxirane oxygen based on solids) and an epoxy equivalent weight of 1600 based on solids.

In some embodiments, the vinyl chloride/vinyl acetate polymer comprises at least one sulfonate functional group. A non-limiting example of a suitable sulfonate functional vinyl chloride/vinyl acetate polymer is UCARMAG™ binder 569 sulfonate functional vinyl chloride/vinyl acetate polymers (prepared from 85 weight percent vinyl chloride, 13 weight percent vinyl acetate and 2 weight percent sulfonate containing monomer). UCARMAG™ binder 569 sulfonate functional, vinyl chloride/vinyl acetate polymer is provided as 20% resin solids in MEK/toluene solution, 50/50 by weight.

The vinyl chloride/vinyl acetate polymer is present in an amount ranging from about 0.1 to about 20 weight percent of the composition, on a basis of total weight of the composition. In other embodiments, the amount of vinyl chloride/vinyl acetate polymer can range from about 5 to about 10 weight percent of the composition.

In some embodiments, the number average molecular weight (Mn) of the vinyl chloride/vinyl acetate polymer is at about 3,000 to about 75,000 g/mole, preferably about 13,000 to about 44,000 g/mole.

The composition comprises one or more cationic photoinitiators. Suitable cationic photoinitiators include those having as a counter ion a phosphorous or antimony metal complex with the appropriate number of halogen (such as fluorine) atoms per metal atom. In the context of surface mount electronic component attachment, see U.S. Pat. No. 4,916,805 (Elirich), which discloses certain photoinitiators having counter ions, such as $PF_6^-$, $BF_4^-$, $AsF_6^-$ and $SbF_6^-$.

Other cationic photoinitiators suitable for use herein include onium salts represented by the general formula:

$$[R^{22}-A^+]_m[X^-]_n$$

wherein:

$R^{22}$ is one or more aromatic radicals which can be the same or different, for example aryl, alkaryl, and aralkyl groups, including fused ring structures comprising an aromatic ring, which may be optionally substituted with a linear, branched or cyclic $C_8$ to $C_{20}$ radical of alkyl, alkylene, alkoxy, alkyleneoxy, a nitrogen, oxygen or sulfur heterocyclic radical of 4 to 6 carbon atoms in the ring; or a mixture thereof, $A^+$ is selected from iodonium cation mono-substituted with $C_1$ to $C_{20}$ alkyl or aryl optionally substituted with $C_1$ to $C_{20}$ alkyl or alkoxy and sulfonium cation di-substituted with $C_1$ to $C_{20}$ alkyl or aryl optionally substituted with $C_1$ to $C_{20}$ alkyl or alkoxy or a mixture thereof;

$X^-$ is a non-basic, non-nucleophilic anion, examples of which include $PF_6^-$, $BF_4^-$, $AsF_6^-$, $SbF_6^-$, $ClO_4^-$, $CF_3SO_3^-$, $(C_5F_5)_4B^-$ and the like;

m ranges from 1 to 3; and n ranges from 1 to 3, wherein m is equal to n.

Non-limiting examples of such cationic photoinitiators include diaryliodonium, triarylsulfonium, diaryliodosonium, triarylsulfoxonium, dialkylphenacylsulfonium and alkylhydroxyphenylsulfonium salts. See e.g. U.S. Pat. Nos. 4,219,654 (Crivello); 4,058,400 (Crivello); 4,058,401 (Crivello) and 5,079,378 (Crivello). Other examples include triarylsulfonium and diaryliodonium salts containing non-nucleophilic counterions such as diphenyl iodonium chloride, diphenyl iodonium hexafluorophosphate, 4,4-dioctyloxydiphenyl iodonium hexafluorophosphate, triphenylsulfonium tetrafluoroborate, diphenyltolylsulfonium hexafluorophosphate, phenylditolylsulfonium hexafluoroarsenate, and diphenyl-thiophenoxyphenylsulfonium hexafluoroantimonate, and those available from Sartomer, Exton, Pa. under the SARCAT tradename, such as SARCAT CD 1010 [triaryl sulfonium hexafluoroantimonate (50% in propylene carbonate)]; SARCAT DC 1011 [triaryl sulfonium hexafluorophosphate (50% n-propylene carbonate)]; SARCAT DC 1012 (diaryl iodonium hexafluoroantimonate); SARCAT K185 [triaryl sulfonium hexafluorophosphate (50% in propylene carbonate)] and SARCAT SR1010 [triarylsulfonium hexafluoroantimonate (50% in propylene carbonate)]; and SARCAT SR1012 (diaryliodonium hexafluoroantimonate), and those available from Dow under the CYRACURE tradename, such as UVI-6976 mixture of triarylsulfonium hexafluoroantimonate salts in propylene carbonate, the triarylsulfonium hexafluoroantimonate salts being selected from the group consisting of:

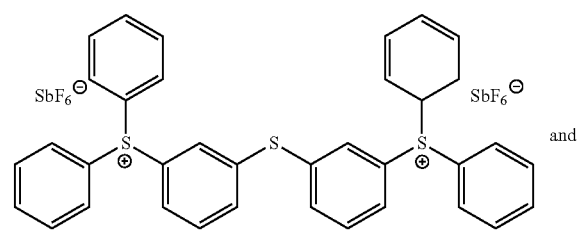

and

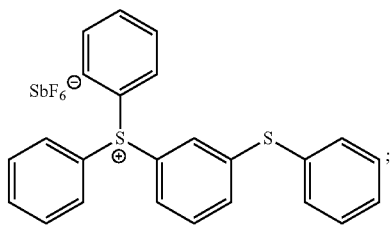

and UVI-6992 (mixed triarylsulfonium hexafluorophosphate salts).

Other useful cationic photoinitiators include UV 9385C (an alkylphenyl iodonium hexafluorophosphate salts) and UV 9390C (an alkylphenyl iodonium/hexafluoroantimonate salt) available from General Electric Corporation; CGI 552 (an alkylphenyl iodonium hexafluorophosphate salt); and RADCURE UVACure 1590 available from UCB, Belgium; and a cationic photoinitiator for silicone-based release coatings, whose counter ion contains fluoride atoms covalently bound to aromatic carbon atoms of the counter ion, such as $B(C_6F_5)_4$ available from Rhodia Chemie. See International Patent Application Nos. PCT/FR97/00566 and PCT/FR98/00741. See also Rhone-Poulenc Chemie's U.S. Pat. Nos. 5,550,265 (Castellanos), 5,668,192 (Castellanos), 6,147,184 (Castellanos), and 6,153,661 (Castellanos).

Other useful cationic photoinitiators include those having a core cation of structure I below:

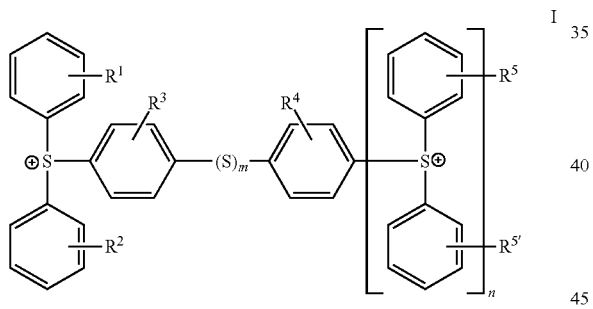

wherein $R^1$, $R^2$, $R^3$, $R^4$, $R^5$ and $R^{5'}$ are each independently selected from the group consisting of H, $C_{1-6}$ alkyl, $C_{2-6}$ alkenyl, halogen, hydroxyl and carboxyl, n is 0-3 and m is 0-1, such as for example those represented by structures II and III:

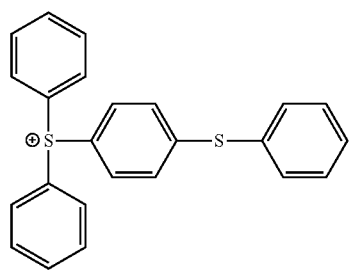

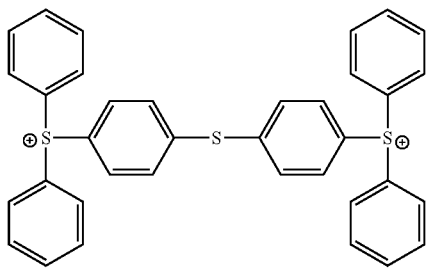

Other useful cationic photoinitiators include those having core cations of structures IV, V, and VI:

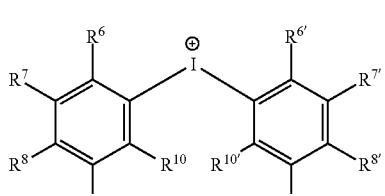

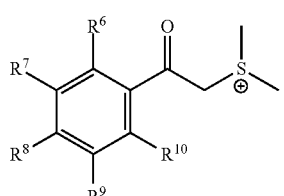

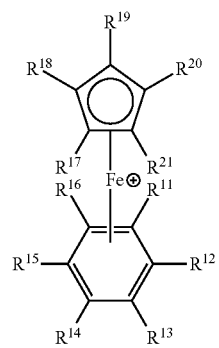

wherein:
for structure IV, $R^6$, $R^7$, $R^8$, $R^9$ and $R^{10}$ are each independently selected from the group consisting of H, alkyl, such as from 1 to 5 carbon atoms, halogen, hydroxyl, and carboxyl;

for structure V, $R^6$, $R^7$, $R^8$, $R^9$, $R^{10}$, $R^{6'}$, $R^{7''}$, $R^{8'}$, $R^{9'}$, and $R^{10'}$ are each independently selected from the group consisting of H, alkyl, such as from 1 to 5 carbon atoms, halogen, hydroxyl, and carboxyl; and for structure VI, $R^{11}$, $R^{12}$, $R^{13}$, $R^{14}$, $R^{15}$, $R^{16}$, $R^{17}$, $R^{18}$, $R^{19}$, $R^{20}$, and $R^{21}$ are each independently selected from the group consisting of H, alkyl, such as from 1 to 5 carbon atoms, halogen, hydroxyl, and carboxyl.

More specific examples of cationic photoinitiators having core cations within structure IV, V and VI include those represented by structures VII(a) and VII(b), VIII and IX (the latter of which is available under the tradename IRGACURE 261 from Ciba Specialty Chemicals), respectively:

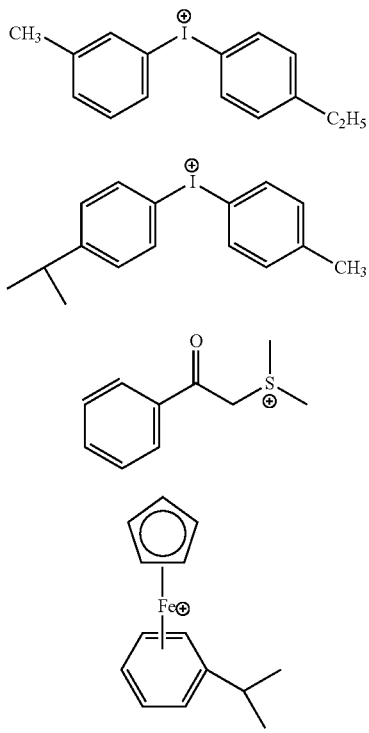

Structure VII(b) is the cationic portion of the RHODOSIL 2074 photoinitiator, available from Rhodia Chemie, whose chemical name is tolylcumyl iodonium tetrakis(pentafluorophenyl)borate (CAS No. 178233-72-2).

The cationic photoinitiator can be present in an amount of up to about 5 percent by weight, such as about 0.01 to about 3, for example 0.5 to 2 percent by weight on a basis of total weight of the composition.

The composition can further comprise one or more free radical initiators. Many suitable free radical initiators are available, though benzophenone, 1-hydroxycyclohexyl phenyl ketone, 2,2-dimethoxy-2-phenyl acetophenone (such as IRGACURE 651 available from Ciba) and combinations thereof (such as the former two in a 1:1 by weight ratio available from Ciba under the tradename IRGACURE 500) are particularly desirable. Other useful free radical initiators available from Ciba include 2-benzyl-2-N,N-dimethylamino-1-(4-morpholino phenyl)-1-butane (IRGACURE 369), 2-methyl-1-[4(methylthio)phenyl]-2-morpholino propane-1-one (IRGACURE 907), 2-hydroxyl-2-methyl-1-phenyl-propane-1-one (DAROCURE 1173), 1-hydroxycyclohexyl phenyl ketone, 2,2-dimethoxy-2-phenyl acetophenone, bis(2,6-dimethoxybenzoyl-2,4,4-trimethyl pentyl) phosphine oxide, bis(2,4,6-trimethyl benzoyl)phenyl phosphine oxide, 4-(2-hydroxyethyoxy)phenyl-(2-hydroxy-2-methyl-propyl)ketone, 2,4,6-trimethylbenzoyl-diphenylphosphine oxide, and combinations thereof.

The free radical initiator can be present in an amount of up to about 5 percent by weight, such as about 0.01 to about 3 percent by weight, for example 0.5 to 2 percent by weight of the composition.

The cationic photoinitiator and the free radical initiator can be used in a ratio of 4:1 to 1:4, such as 2:1 to 1:2, for example 1.5:1 to 1:1.5, to achieve acceptable open cure time and as modified within that range by the end user consumer, depending on the end user consumer preferences.

In some embodiments, the composition can further comprise one or more visible light photoinitiators and/or photosensitizers. An example of such a material is camphorquinone ("CPQ"), though others such as 9-fluorene carboxylic acid peroxyesters, visible light [blue]photoinitiators, IRGACURE 784DC (photoinitiator based on substituted titanocenes), and combinations thereof, may be used.

Other suitable photoinitiator systems triggered in the visible range of electromagnetic spectrum may be used and include those disclosed in: U.S. Pat. No. 4,505,793 (Tamoto) which discloses a combination of a 3-keto-substituted cumarin compound and active halogeno compound photopolymerization initiators that cure by exposure to light having wavelengths ranging between about 180 nm and 600 nm; European Patent Publication No. EP 0 369 645 A1 which discloses a three-part photoinitiator system which includes a trihalomethyl substituted-s-triazine, a sensitizing compound capable of absorbing radiation in the range of about 300-1000 nm (such as ketones; coumarin dyes; xanthene dyes; 3H-xanthen-3-one dyes; acridine dyes; thiazole dyes; thiazine dyes; oxazine dyes; azine dyes; methane and polymethine dyes; porphyrins; aromatic polycyclic hydrocarbons; merocyanines; and squarylium dyes) and an electron donor (such as ethers; ferrocene; sulfinic acids and their salts; salts of ferrocyanide; ascorbic acid and its salts; dithiocarbamic acid and its salts; salts of xanthates; salts of ethylene diamine tetraacetic acid; and salts of tetraphenylboronic acid); European Patent Publication No. EP 0 563 925 A1 which discloses photopolymerization initiators including a sensitizing compound that is capable of absorbing radiation in the range of about 250-1000 nm (such as cyanine dye, merocyanine dye, coumarin dye, ketocoumarin dye, (thio)xanthene dye, acridine dye, thiazole dye, thiazine dye, oxazine dye, azine dye, squarylium dye, porphyrin dye, triaryl methane dye, (poly) methane dye, and aromatic polycyclic hydrocarbons); U.S. Pat. No. 5,395,862 (Neckers) which discloses fluorone initiator systems including a coinitiator that is capable of accepting an electron from the excited fluorone species (such as onium salts, nitrohalomethanes and diazosulfones); U.S. Pat. No. 5,451,343 (Neckers) which discloses fluorone and pyronin-Y derivatives as initiators that absorb light at wavelengths of greater than 350 nm; and U.S. Pat. No. 5,545,676 (Palazzotto) which discloses a three-part photoinitiator system including an arylidonium salt, a sensitizing compound and an electron donor which cures under UV or visible light, each of the foregoing references being incorporated by reference herein.

These photoinitiators triggered in the visible range of the electromagnetic spectrum may be present in amounts of about 0.1% to about 10% by weight, for example 0.5% to about 5% by weight on a basis of total weight of the composition.

When used, these photoinitiators can permit the inventive compositions to cure dry-to-the-touch, forming reaction products with tack-free exterior surfaces.

The inclusion of such a photoinitiator broadens the energy sources available to cure the inventive composition. For example, a LED device generating radiation in or about 470 mm may be used to cure the inventive compositions, such as is described in International Patent Publication No. WO 04/011848 and International Patent Application No. PCT/US2005/016900, each of which is incorporated by reference herein.

In some embodiments, one or more oxetane-containing compounds may be included in the inventive compositions. These oxetane-containing compounds seem to improve photocure and/or toughness of the composition. Examples of such oxetanes include

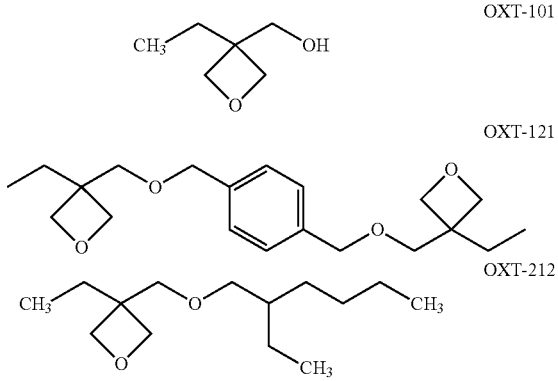

(available from To a Gosei Co., Ltd., Japan)

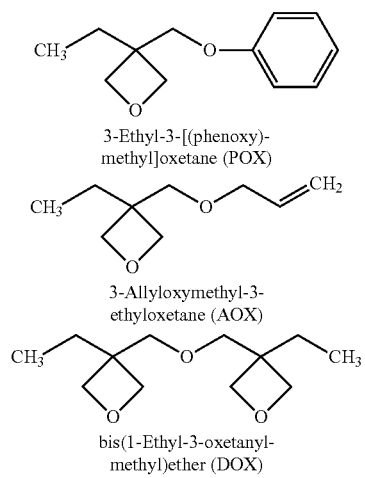

The composition can further comprise one or more reactive diluents, for example polyols or diols such as dibenzyl alcohol, diethylene glycol, polyethylene glycol, or poly THF diol. Useful polyester and/or polyether diols and polyols are available from King Industries, such as those under the trade designations K-FLEX 128 (polyester/polyether diol) and K-FLEX XM-A307 (polyester diol), or TONE 0201, 0210 or 0310 available from Dow Chemical. The reactive diluent may be added to modify the glass transition temperature ("Tg") and modulus of the cured reaction product by participating in the cross-linking reaction with the epoxy under cure conditions. The reactive diluents also can improve adhesion on substrates constructed from various plastic or synthetic materials, and oftentimes metals.

In some embodiments, elastomers or polyacrylates can be included in the composition. Suitable polyacrylates can have at least one terminal group represented by —SiR$^A_3$, wherein each R$^A$ is independently selected from the group consisting of hydrogen or a $C_1$ to $C_{20}$ hydrocarbon radical, —$C_6H_5$, —$CH_2OH$, phenyl, alkoxy and —CN, provided that in at least one instance R$^A$ is alkoxy. Alkyl (meth)acrylate polyacrylate(s) may be included in the composition. Suitable alkyl (meth)acrylate polyacrylates include homopolymers of $C_1$-$C_{10}$ (meth)acrylates or copolymers of $C_1$-$C_{10}$ (meth)acrylates. Suitable alkyl acrylates include, but are not limited to, ethyl acrylate, butyl acrylate and 2-ethylhexyl acrylate. Copolymeric acrylate elastomers or rubbers may contain copolymerized units of up to 40 weight percent monovinyl monomers, for example, styrene, acrylonitrile, vinylbutyl ether, acrylic acid and $C_1$-$C_{10}$ alkyl acrylates different from the principal alkyl acrylate comonomer.

The elastomer may also be a polyfunctional (meth)acrylate polymer. Such polymers may have a high degree of functionality due to the presence of multiple functional groups in the main chain of the polymer, as well as functional terminal groups. In some embodiments, such elastomers may include a polyfunctional (meth)acrylate portion and at least one monofunctional (meth)acrylate portion. The polyfunctional (meth)acrylate portion may compose the main chain of the polymer while the monofunctional (meth)acrylate portions are terminal groups.

For example, the elastomer may be a (meth)acryloyl-terminated vinyl polymer. Such vinyl polymers accordingly may have at least one terminal group per molecule represented by: —OC(O)C(R)=CH$_2$. The number of these groups per molecule is not particularly restricted, but is desirably not less than 1 per molecule. In some embodiments, the number of the groups per molecule is 1.2 to 4. R represents hydrogen or an organic group of 1 to 20 carbon atoms for example hydrogen or a hydrocarbon group of 1 to 20 carbon atoms, thus including such species as —H, —CH$_3$, —CH$_2$CH$_3$, —(CH$_2$)$_n$CH$_3$, where n is an integer of 2 to 19, —C$_6$H$_5$, —CH$_2$OH and —CN, among others. More desired are —H and —CH$_3$, and —CH$_2$OH.

The composition can further comprise one or more inorganic filler components, such as reinforcing silicas or fused silicas that may be untreated or treated so as to alter the chemical nature of their surface. Virtually any reinforcing fused silica may be used. Alternatively, the inorganic filler component may be a fumed silica, which may impart thixotropy to the composition. Other useful materials for the inorganic filler component include those comprising aluminum oxide, silicon nitride, aluminum nitride, silica-coated aluminum nitride and micronized quartz, provided they are not basic in nature.

In some embodiments, the composition includes up to about 98 weight percent, for example about 45 weight percent to about 90 weight percent, such as from about 35 to about 80 weight percent, desirably about 60 to about 75 weight percent, of the epoxy resin component by weight of the total composition; about 0.1 to about 20 weight percent of vinyl chloride/vinyl acetate copolymer by weight of the total composition; up to about 25 weight percent of the reactive diluent by weight of the total composition; up to about 5 weight percent, such as about 0.01 to about 2 weight percent of the cationic photoinitiator by weight of the total composition; and up to about 5 weight percent, such as about 0.01 to about 2 weight percent of the free radical initiator, by weight of the total composition. Of course, depending on the particular set of properties desirable for a composition destined for a specific purpose these values may vary somewhat.

The inventive compositions are capable of demonstrating significant improvement in physical properties, such as impact strength and toughness, when used to bond metals and plastic substrates, without adversely affecting cure rate.

The present invention also provides methods for bonding a pair or more of substrates, using the compositions so described. In some embodiments, the methods of bonding substrates, comprise the steps of: (a) providing a first substrate; (b) providing a second substrate; (c) providing a composition as described above on at least one of the first or second substrates; (d) exposing the composition to conditions sufficient to initiate cure thereof; and (e) mating the first and second substrates, and allowing the composition to achieve greater than 85% of its ultimate strength.

In other embodiments, the present invention provides methods for attaching a first substrate to a second substrate, comprising the steps of: (a) applying a composition as described above to the first substrate; (b) activating the composition prior to or after application thereof through exposure to radiation in the electromagnetic spectrum; and (c) positioning the other substrate onto the one substrate; and (d) optionally, curing the composition at a temperature between 60° C. and 160° C.

One such method includes the steps of applying such a composition to at least one substrate, activating the composition prior to, during or after application thereof through exposure to radiation in the electromagnetic spectrum, such as UV radiation a wavelength in a range of 254-405 nm, to such an extent that a desired initial tackiness is maintained and no skin formation on the surface of the composition occurs; positioning the one substrate onto the other substrate; and allowing the composition to cure to bond the pair or more substrates, and optionally, speeding cure of the composition by exposure to a temperature between about 60 and about 175° C., such as about 80 to about 150° C.

Another such method of bonding substrates provided by the present invention uses at least one substrate which has less than 50% optical transmission. Such substrates may be colored and/or opaque. The steps of this method include providing a first substrate, providing a second substrate, where at least one of the first and second substrates has less than 50% optical transmission, providing the inventive composition on at least one of the first or second substrates, exposing the composition to conditions sufficient to initiate cure thereof, mating the first and second substrates, and allowing the composition to achieve greater than 85% of its ultimate strength.

In some embodiments, the inventive compositions are capable of achieving an open time of from 1 second to about five minutes (before gelling occurs rendering it unsuitable for adhesive applications), and developing greater than about 85% of its ultimate cure after a period of time of 24 hours at room temperature.

The following examples are presented to further illustrate the invention, without intending to narrow or depart from its scope.

EXAMPLES

In the following examples, samples were prepared from Eponex 1510 hydrogenated cycloaliphatic epoxide and selected vinyl chloride/vinyl acrylate copolymers to evaluate cure profiles and physical properties, such as impact strength.

Example 1

Table 1 below shows samples prepared from EPONEX 1510 diglycidyl ether of hydrogenated bisphenol A epoxy resin, CYRACURE UVI-6976 mixture of triarylsulfonium hexafluoroantimonate salts in propylene carbonate cationic photoinitiator and five different UCAR™ vinyl chloride/vinyl acetate polymers at selected concentrations, as well as a Control sample without vinyl chloride/vinyl acetate polymer.

Table 1

| Component | | Sample No. / Amt. (Parts per 100 parts of resin) | | | | | | | |
|---|---|---|---|---|---|---|---|---|---|
| Identity | Type | 1 | 2 | 3 | 4 | 5 | 6 | 7 | Control |
| Diglycidyl ether of hydrogenated bisphenol A epoxy resin | EPONEX 1510 | 100 | 100 | 100 | 100 | 100 | 100 | 100 | 100 |
| Cationic photoinitiator | CYRACURE UVI-6976 | 2 | 2 | 2 | 2 | 2 | 2 | 2 | 2 |
| Vinyl chloride/vinyl acetate polymer | UCAR™ VYHD | 5 | 10 | — | — | — | — | — | — |
| | UCAR™ VYNS-3 | — | — | 5 | 10 | — | — | — | — |
| | UCAR™ VYNC-P | — | — | — | — | 5 | — | — | — |
| | UCAR™ VYLF-X | — | — | — | — | — | 5 | — | — |
| | UCAR™ VROH | — | — | — | — | — | — | 5 | — |

Five specimens of each Sample were prepared by applying the respective Sample composition to a grit blasted steel lap shear which had been previously cleaned with an acetone wipe. Each coated specimen was exposed to radiation in the ultraviolet range of the electromagnetic spectrum at an intensity of 140 mW/cm$^2$ for 4 seconds.

Thereafter, a second lap shear was applied thereover such that a one inch overlap existed between the lap shears with the sample therebetween. In order to ensure complete cure, the assembled lap shear specimens were further exposed to a temperature of 150° C. for one hour, after which they were tested for impact strength of the adhesive bond in shear according to General Motors Test Method GM9751P (1988) using a 2 kg. impact head. Test results are shown in FIG. 1. As shown in FIG. 1, specimens bonded using Sample Nos. 1-7 including vinyl chloride/vinyl acetate polymers according to the present invention had better impact strength than the Control specimens without the vinyl chloride/vinyl acetate polymer.

Example 2

Figure 2:
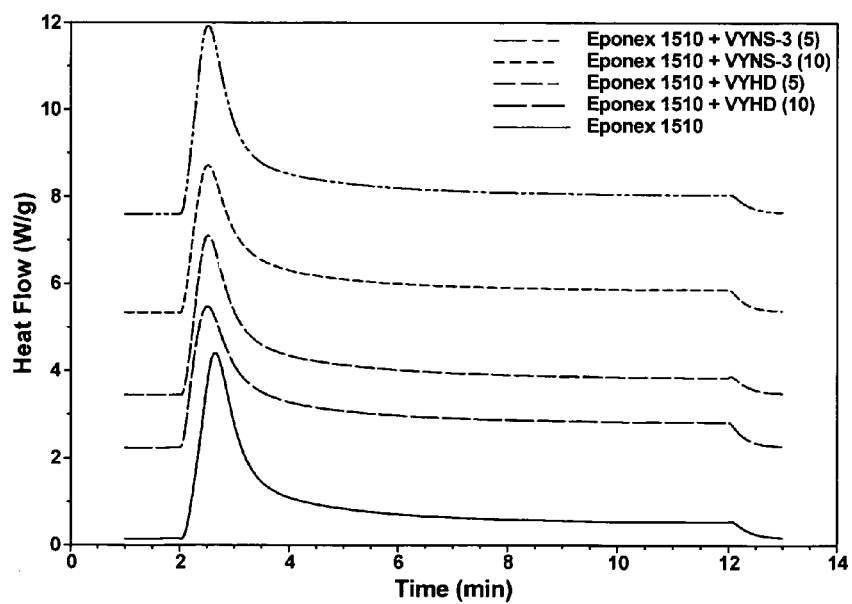
FIG. 2 is a graph of differential photocalorimetry ("DPC") data for several compositions comprising a hydrogenated bisphenol A epoxy resin and selected vinyl chloride/vinyl acetate copolymers, according to the present invention.
Figure 3:
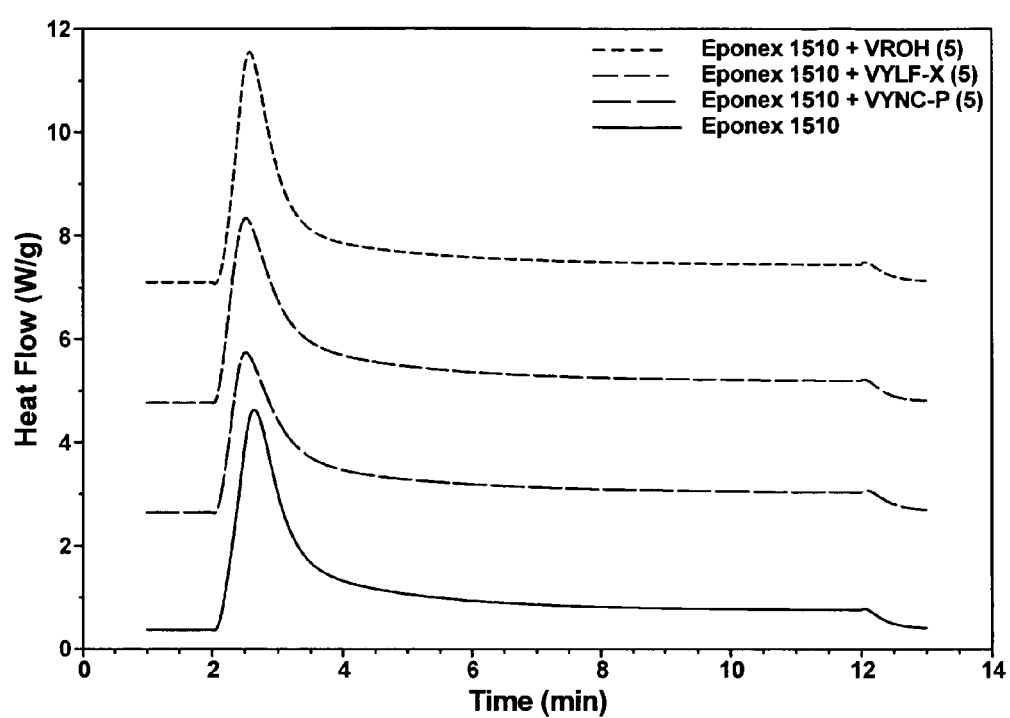
FIG. 3 is a graph of DPC data for several compositions comprising a hydrogenated bisphenol A epoxy resin and selected vinyl chloride/vinyl acetate copolymers, according to the present invention.

The sample compositions (1-7) and Control were evaluated using Differential Photocalorimetry (DPC) to determine the effect on cure rate by including vinyl chloride/vinyl acetate polymer in the composition. The DPC analysis was performed using a TA Instruments 2920 Differential Scanning calorimeter (DSC) with a photocalorimeter accessory at atmospheric pressure using nitrogen for 10 minutes at an ultraviolet light intensity of 59 mW/cm$^2$. Test results are shown in FIGS. 2 and 3. As shown in FIGS. 2 and 3, the cure rate was not appreciably affected when comparing the Sample Compositions 1-7 (including vinyl chloride/vinyl acetate polymer) to the Control Sample without vinyl chloride/vinyl acetate polymer.

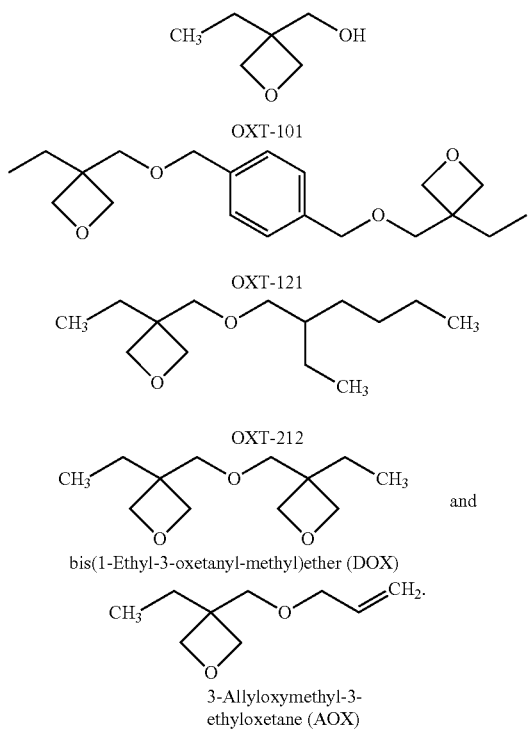

What is claimed is:

1. A photoinitiated cationically curable composition, consisting of:
   (a) at least one substantially saturated epoxy material comprising at least two glycidyl ether groups;
   (b) about 0.1 to about 20 weight percent on a basis of total weight of the composition of at least one polymer comprising at least one vinyl chloride segment and at least one vinyl acetate segment and;
   (c) an initiator consisting of a cationic photoinitiator.

2. The composition according to claim 1, wherein the glycidyl ether group is embraced by the following structure:

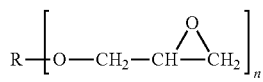

wherein n is 2-7 and R is any substantially saturated hydrocarbon, optionally comprising ether or ester linkages.

3. The composition according to claim 1, wherein the substantially saturated epoxy material is a diglycidyl ether epoxy compound having a saturated backbone selected from the group consisting of hydrogenated bisphenol A, hydrogenated bisphenol F, hydrogenated bisphenol S and hydrogenated biphenyl.

4. The composition according to claim 1, wherein the substantially saturated epoxy material is selected from the group consisting of $C_4$-$C_{70}$ alkyl or alkenyl glycidyl ethers; $C_2$-$C_{70}$ alkyl or alkenyl glycidyl esters; cycloalkyl or cycloalkenyl glycidyl ethers; polyglycidyl ethers of hydrogenated pyrocatechol, hydrogenated resorcinol, hydrogenated hydroquinone, 4,4'-dihydroxydicyclohexyl methane, 4,4'-dihydroxy-3,3'-dihydroxydicyclohexyl methane, 4,4'-dihydroxydicyclohexyl dimethyl methane, 4,4'-dihydroxydicyclohexyl methyl methane, 4,4'-dihydroxydicyclohexyl cyclohexane, 4,4'-dihydroxy-3,3'-dimethyldicyclohexyl propane, 4,4'-dihydroxydicyclohexyl sulfone, and tris(4-hydroxycyclohexyl) methane; and combinations thereof.

5. The composition according to claim 1, wherein the substantially saturated epoxy material comprises:

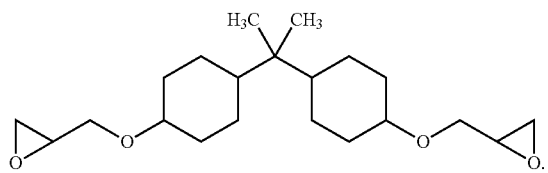

6. The composition according to claim 1, wherein the amount of substantially saturated epoxy material ranges from about 40 to about 99 weight percent of the composition, on a basis of total weight of the composition.

7. The composition according to claim 1, wherein the polymer (b) comprises about 80 to about 90 weight percent of vinyl chloride.

8. The composition according to claim 1, wherein the polymer (b) comprises about 4 to about 20 weight percent of vinyl acetate.

9. The composition according to claim 1, wherein the polymer (b) has number average molecular weight of about 3,000 to about 75,000 g/mole.

10. The composition according to claim 1, wherein the polymer (b) comprises at least one functional group selected from the group consisting of hydroxy functional group, carboxy functional group, epoxy functional group, sulfonate functional group and combinations thereof.

11. The composition according to claim 1, wherein the polymer (b) is prepared from vinyl chloride, vinyl acetate and about 1 to about 15 weight percent of hydroxyethyl acrylate.

12. The composition according to claim 1, wherein the amount of vinyl chloride/vinyl acetate polymer ranges from about 1 to about 20 weight percent of the composition, on a basis of total weight of the composition.

13. The composition according to claim 1, wherein the cationic photoinitiator is selected from the group consisting of triarylsulfonium, diaryliodonium and aryl diazonium salts containing non-nucleophilic counterions, 4-methoxybenzenediazonium hexafluorophosphate, benzenediazonium tetrafluoroborate, diphenyl iodonium chloride, diphenyl iodonium hexafluorophosphate, 4,4-dioctyloxydiphenyl iodonium hexafluorophosphate, triphenylsulfonium tetrafluoroborate, diphenyltolylsulfonium hexafluorophosphate, phenylditolylsulfonium hexafluoro arsenate, diphenylthiophenoxyphenylsulfonium hexafluoroantimonate, triaryl sulfonium hexafluoroantimonate, triaryl sulfonium hexafluorophosphate and diaryl iodonium hexafluoroantimonate.

14. The composition according to claim 13, wherein the cationic photoinitiator is selected from the group consisting of triarylsulfonium, diaryliodonium and aryl diazonium salts containing non-nucleophilic counterions.

15. The composition according to claim 1, wherein the cationic photoinitiator comprises a cationic counter ion within the following structure:

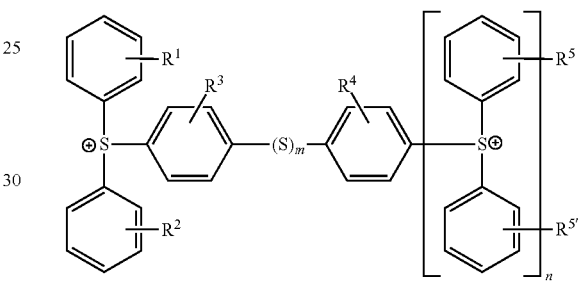

wherein $R^1$, $R^2$, $R^3$, $R^4$, $R^5$ and $R^{5'}$ are each independently selected from the group consisting of H, $C_{1-6}$ alkyl, $C_{2-6}$ alkenyl, halo, hydroxyl and carboxyl, n is 0-3 and m is 0-1.

16. The composition according to claim 1, wherein the cationic photoinitiator comprises a mixture of triarylsulfonium hexafluoroantimonate salts in propylene carbonate, the triarylsulfonium hexafluoroantimonate salts being selected from the group consisting of:

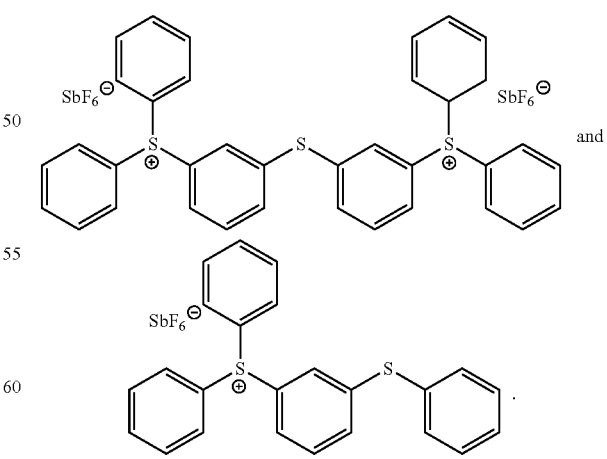

17. The composition according to claim 1, wherein the cationic photoinitiator comprises tolylcumyl iodonium tetrakis(pentafluorophenyl)borate.

18. The composition according to claim 1, wherein cationic photoinitiator is used in an amount within the range of about 0.1 to about 3 percent by weight of the total composition.

19. The composition according to claim 1, wherein the photoinitiator is triggered by exposure to radiation in the visible range of the electromagnetic spectrum.

20. A method of bonding substrates, comprising the steps of:
   (a) providing a first substrate;
   (b) providing a second substrate;
   (c) providing a composition according to claim 1 on at least one of the first or second substrates;
   (d) exposing the composition to conditions sufficient to initiate cure thereof; and
   (e) mating the first and second substrates, and allowing the composition to achieve greater than 85% of its ultimate strength.

21. A method for attaching a first substrate to a second substrate, comprising the steps of:
   (a) applying a composition according to claim 1 to the first substrate;
   (b) activating the composition prior to or after application thereof through exposure to radiation in the electromagnetic spectrum; and
   (c) positioning the other substrate onto the one substrate; and
   (d) optionally, curing the composition at a temperature between 60° C. and 160° C.

22. A photoinitiated cationically curable composition, consisting of:
   (a) at least one substantially saturated epoxy material comprising at least two glycidyl ether groups;
   (b) about 0.1 to about 20 weight percent on a basis of total weight of the composition of at least one polymer comprising at least one vinyl chloride segment and at least one vinyl acetate segment;
   (c) an initiator consisting of a cationic photoinitiator; and
   (d) at least one oxetane-containing compound including at least one oxetane functional group in the compound.

23. The composition according to claim 22, wherein the oxetane-containing compound is selected from the group consisting of